Figure 1:
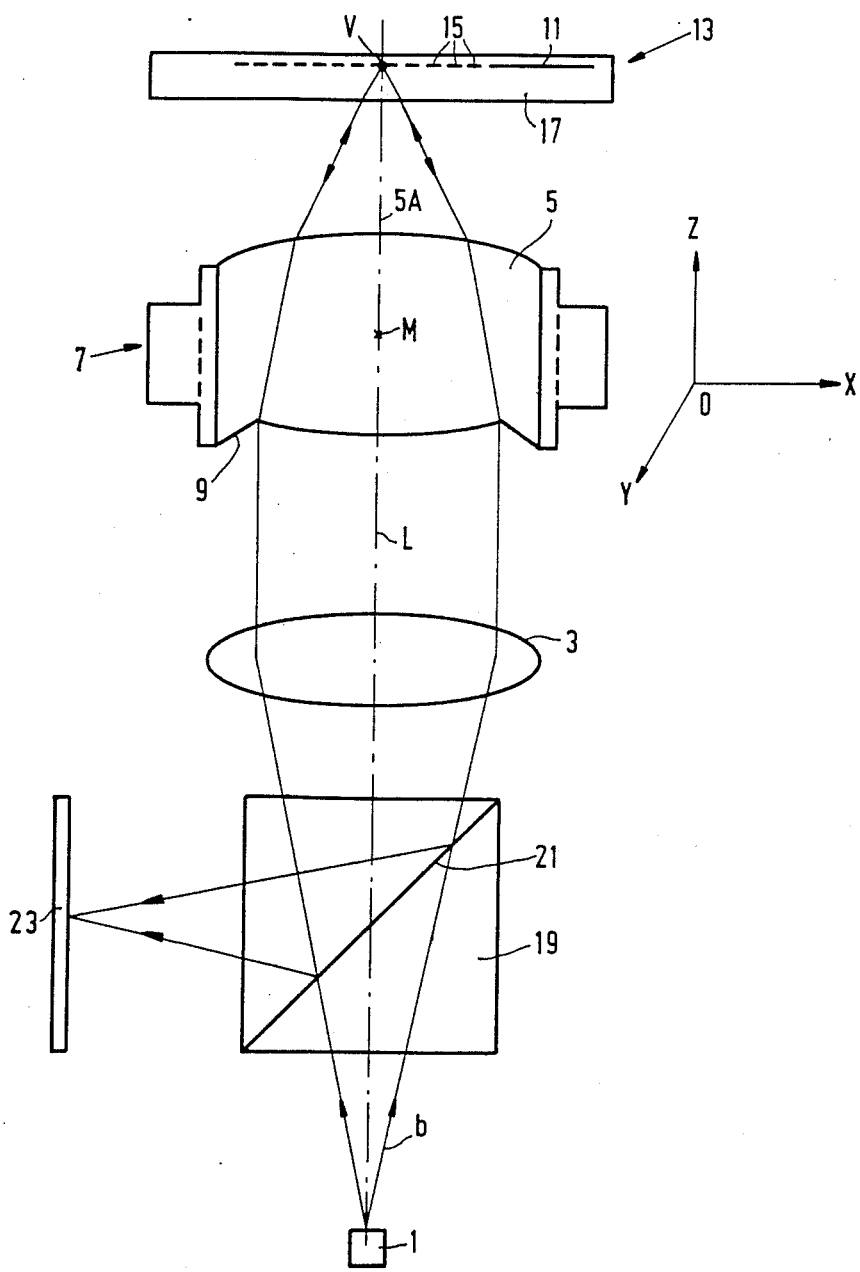

United States Patent [19]

Gijzen et al.

[11] Patent Number: 4,783,775
[45] Date of Patent: Nov. 8, 1988

[54] DRIVER FOR AN OBJECTIVE OF AN OPTICAL SCANNING UNIT

[75] Inventors: Wilhelmus A. H. Gijzen, Eindhoven, Netherlands; Leonhard Honds; Karl-Hanns Meyer, both of Aachen, Fed. Rep. of Germany; Robert N. J. Van Sluys; Gerard E. Van Rosmalen, both of Eindhoven, Netherlands

[73] Assignee: U.S. Philips Corporation, New York, N.Y.

[21] Appl. No.: 889,149

[22] Filed: Jul. 24, 1986

[30] Foreign Application Priority Data

Aug. 14, 1985 [DE] Fed. Rep. of Germany ....... 3529088
Aug. 14, 1985 [DE] Fed. Rep. of Germany ....... 3529089
Nov. 25, 1985 [NL] Netherlands ..................... 8503237

[51] Int. Cl.⁴ ................................................ G11B 7/00
[52] U.S. Cl. ..................................... 369/44; 250/201; 369/45
[58] Field of Search ....................... 369/43, 45, 44, 46, 369/47; 250/201 DF; 358/342

[56] References Cited

U.S. PATENT DOCUMENTS 4,490,011 12/1984 Houbregs et al. ................ 369/45 X
4,643,522 2/1987 Takashima ........................ 369/45 X
4,658,390 4/1987 Fujii et al. ............................ 369/45

Primary Examiner—Robert L. Richardson
Attorney, Agent, or Firm—Algy Tamoshunas

[57] ABSTRACT

An optical scanning unit with an objective for the focussing a beam of radiation along an optical axis into a scanning spot on the surface of an information carrier. The scanning unit also has an electromagnetic drive for correcting the position of the objective with respect to the information carrier. The drive has an objective mount supported in an annular, moving magnetic member which is axially magnetized and is arranged coaxially about the optical axis. The drive is further provided with fixed coils which interact with the magnetic member via an air gap. The fixed coils are arranged along at least three radial planes which are normal to the optical axis. Two planes lie in the area of the axial ends of the centrally positioned magnetic member and the third central plane which extends between the two outer radial planes.

24 Claims, 13 Drawing Sheets

DRIVER FOR AN OBJECTIVE OF AN OPTICAL SCANNING UNIT

The invention relates to an optical scanning unit for the control and alignment of a beam of rays on recording tracks on an information carrier surface to be scanned. Such a scanning unit has an objective with an objective lens for focussing the radiation beam along an optical axis into a scanning spot on the surface of the information carrier. The scanning unit also has an electromagnetic drive device for continuous correction of the position of the objective with respect to the information carrier. The drive device is fitted with an objective mount for the objective. The objective mount has a moving annular magnetic body of permanent-magnetic material which is arranged coaxially to the optical axis. The drive device is further provided with fixed coils which lie in external radial planes in the area of the axial ends of the centrally positioned magnetic body and interact magnetically with the magnetic body through an air gap.

Such an optical scanning unit is disclosed in German Patent 32 34 288 which corresponds to U.S. Pat. No. 4,602,848 incorporated herein. In this known scanning unit, the objective is fixed in a moving, axially permanently-magnetized sleeve with the magnetic poles at its two axial ends. The fixed coils of the drive are segmental coils and are arranged in two sets of three or four coils each, a coil set being located in the vicinity of the two ends of the sleeve. The individual segmental coils are designed as flat coils and two coil parts extending coaxially to one another and to the above-mentioned sleeve. When current passes through the coil parts, the current in the coil part lying further away from the sleeve is opposed to the current through the coil part lying nearer to the sleeve. With the known arrangement of the coils it is possible to produce three forces directed along the three axes of an orthogonal coordinate system, as well as two turning moments acting about two of the coordinate axes.

By means of the drive device of the known scanning unit, it is possible in principle to achieve all desired movements of the objective. These movements include an axial movement which is directed parallel to the optical axis of the objective and is used for focussing a light beam into a light spot on an information surface of a rotating optical disc, as well as two radial movements at right angles to one another and/or two tilting movements about two axes directed at right angles to one another and to the optical axis, the latter four movements being used for the radial and tangential track following of the light spot.

One disadvantage of the known drive unit is that the magnetic forces between the coils and the magnetic sleeve vary as a function of the axial displacement of the objective in such a way that even with a small axial displacement of the objective from the central position between the coil sets, the drive device is no longer capable of moving the objective satisfactorily so as to achieve the necessary focussing of the light beam and the necessary track following of the light spot. The widely separately coil sets are suitable in fact for achieving sufficient movement along the optical axis, but the possibility of producing the other movements decreases to rapidly that even at a small displacement from the central position, the objective is no longer adequately driven so as to be able to guarantee the track following of the light spot.

It is the aim of the invention to produce an optical scanning unit of the type mentioned in the preamble with coils arranged in such a way that the forces required for focussing movement and the forces required for track following remain constant or almost constant as the objective is moved over a fairly large distance.

The optical scanning unit of the invention has the added feature that further coils are arranged in at least one central radial plane between the above external radial planes.

In such an optical scanning unit, the forces required for the focussing movement and the forces required for track following remain constant or almost constant as the objective is moved over a relatively large distance.

A preferred embodiment has at least three segmental coils arranged in each case in the external planes and the magnetic body has magnetic poles at its axial ends. A characteristic feature of this embodiment is that in at least one central radial plane there are at least three segmental coils each having an active coil part facing the magnetic body and extending in the peripheral direction of the magnetic body and a coil part further away from the magnetic body, the segmental coils adjoining one another when seen in the peripheral direction of the magnetic body.

The above-described coil configuration of the invention makes it possible to use the coils in the central plane for moving the objective in directions at right angles to the optical axis and to use the coils in the two outer radial planes for movement along the optical axis of the objective, the latter coils still being able to be used, when necessary, for tilting the objective about an axis at right angles to the optical axis. The above possibilities can be achieved with a magnetic body which is axially magnetized in a simple manner.

One advantage of the scanning unit of the invention is that when the coils are excited, the axially and radially directed forces, which the coils exert on the magnetic body, remain almost constant when the objective is moved over a distance which is sufficient for focussing a light spot and keeping it focussed on the information plane of an optical disc. There is also the additional advantage in that the coil configuration of the invention makes it possible to design the coils in the edge zones as flat coils. As a result, the structural height of the scanning unit and the axial dimensions of the magnetic body and, therefore, of the objective mount can be kept small. This makes it quite possible to locate the center of gravity of the objective mount at the center of gravity of the objective lens. This offers the additional advantage in that when the coils in the central zone are excited, in which case radially directed forces re exerted on the objective mount, no uncontrollable moments are created which could lead to tilting of the objective and therefore to drive disturbances.

The segmental coils in the outer radial planes are used mainly for the axial displacement of the objective. By selective excitation of the segmental coils in the outer radial planes, however, it is also possible to exert moments on the magnetic body by means of which (due to tilting of the magnetic body) the objective can undergo slight rotary movements about axes at right angles to the optical axis. The segmental coils in the central radial plane(s) can, when selectively excited, move the objective in the radial direction. This means that in this embodiment only the coils in the outer radial planes are used for focussing a light beam into a light spot and the coils in the central plane(s) can be used, where necessary in combination with the coils in the outer radial planes, for alignment of the objective for following the recording track of an optical disc being scanned.

To produce a constant axially directed lifting force on the objective, a certain minimum distance is required between the segmental coils of the two outer radial planes combined into coil sets. One possible embodiment in which the space between the segmental coil sets is economically used has the characteristic feature that the axial dimensions of the segmental coils in the central radial plane(s) are greater than the axial dimensions of the segmental coils in the edge zones.

With such a coil configuration it is possible to extert large and constant axially and radially directed forces on the objective, making rapid movements of the objective possible. This offers the added advantage that the large number of coils in the central radial plane(s) provide more possible settings and adjustments, which can improve the sensitivity of the servosystem in which the scanning unit is incorporated.

In another preferred embodiment the coil magnetic body is equipped at its axial ends with magnetic poles has the characteristic feature that the coils in each of the above-mentioned radial planes are in the form of annular coils extending coaxially around the magnetic bodies, and there are at least three segmental coils present in the central radial plane(s), these segmental coils adjoining one another when seen in the peripheral direction of the magnetic body.

This preferred embodiment has the advantage in that with the annular coils which are used only for the axial movement of the objective for focussing purposes it is possible to obtain an axial drive with a very high efficiency because the annular coils can be located completely in favourable areas of the magnetic field of the magnetic body.

Because the annular coils cannot exert any torque on the magnetic body, the coils in the central radial plane have to take care of the track following and the angular corrections due to any out-of-trueness of the information carrier. In a suitable embodiment for this purpose, each segmental coil has an active coil part lying opposite the magnetic body and extending in the peripheral direction of the magnetic body and a coil part which is further removed from the magnetic body. This embodiment has a particularly simple construction and requires only a simple control system for activating the segmental coils; when three segmental coils are used, only five amplifiers are required. In a further embodiment which is somewhat more complex, but which results in a high-efficiency radial drive, the segment coils are formed by coil sets, wherein the sets lie alongside one another as seen in the axial direction of the magnetic body and the individual coils of the coil sets each have two parallel active coil parts extending in the peripheral direction of the magnetic body. One of these active coil parts lies radially next to the magnetic body and is connected to the other active coil part by further coil parts angled towards the magnetic body. The other active coil part is located opposite the magnetic pole of the magnetic body assigned to it.

It is especially favourable if the toroidal coils have a number of outwardly protruding projections through which the other coil parts of the segmental coils extend. The segmental coils of this embodiment are designed and aligned with respect to the objective mounting in such a way that by far the largest part of the segmental coils can be arranged in favourable areas of the magnetic field.

According to another embodiment at least three segmental coils are arranged in each case in the outer radial planes and the magnetic body is comprised of two oppositely magnetized ring-shaped parts placed axially on top of one another. A distinctive feature of this embodiment is that the ring-shaped magnetic body is enclosed in the central radial plane by an annular coil.

By introducing the annular coil in the central radial plane, it is possible touse the radial magnetic field in this area to produce axial forces for focussing. With this optical scanning unit, therefore, it is possible to obtain in a simple way a certain separation between the coil actuation for axial and radial forces.

Because of the segmental coil arrangement in the area of the outer radial planes the points of application of the force vectors in the axial direction lie outside the center of gravity of the magnetic body. It is possible therefore to control the objective in such a way that, in addition to the three translational motions in the three coordinate axes already mentioned, it also executes two rotary movements about two of these coordinate axes.

In a further embodiment of the invention the magnetic body is comprised of two part rings between which an intermediate ring is inserted. The intermediate ring may be made of soft-magnetic material or non-magnetic material. The separation of the adjusting actions can be improved thereby.

In a further embodiment of the invention the intermediate ring is made of permanent magnet material and is radially magnetized. The controlling effect of the coil fields is thereby increased.

In yet another embodiment of the invention the magnetic body as a whole is magnetized in such a way that the north poles of the part rings are on the intermediate ring and the north poles of the intermediate ring are at their outside wall.

In another embodiment of the invention, the magnetic body as a whole is magnetized in such a way that the north poles of the part rings are at the outer axial ends and the north poles of the intermediate rings are at their inside wall. In this way it is possible to improve the desired properties of the system and reduce parasitic properties.

In another embodiment of the invention the coils are arranged in the individual radial planes as laminar conductors on circuit boards. The technical design is considerably simplified thereby.

According to a further favourable embodiment of the invention, the magnetic body is comprised of two part rings which are radially magnetized in opposite directions. This makes it possible to amplify the magnetic field areas with mainly radial component compared with those with mainly axial component. In this case it may be desirable to have an intermediate ring, which is axially magnetized, arranged between the part rings. The axial and radial magnetic field areas can be more clearly separated in this way; the parasitic forces and torques are better able to be controlled thereby.

Embodiments of the invention will be explained in detail below with the aid of the drawings which show FIG. 1 a schematic representation of part of the scanning unit of the invention, FIG. 2 an exploded view of a first embodiment of the drive device according to the invention, FIG. 3 a top view of the drive device illustrated in FIG. 2, FIG. 4 a section along the line IV—IV in FIG. 2, FIG. 5 an exploded view of a second embodiment of the drive device of the scanning unit according to the invention, FIG. 6 an exploded view of a third embodiment of the drive unit of the scanning unit according to the invention, FIG. 7 a longitudinal section of the drive device illustrated in FIG. 6, FIG. 8 an exploded view of a fourth embodiment of the drive device of the scanning unit according to the invention, FIG. 9 a longitudinal section through the drive device illustrated in FIG. 9.

Figure 10:
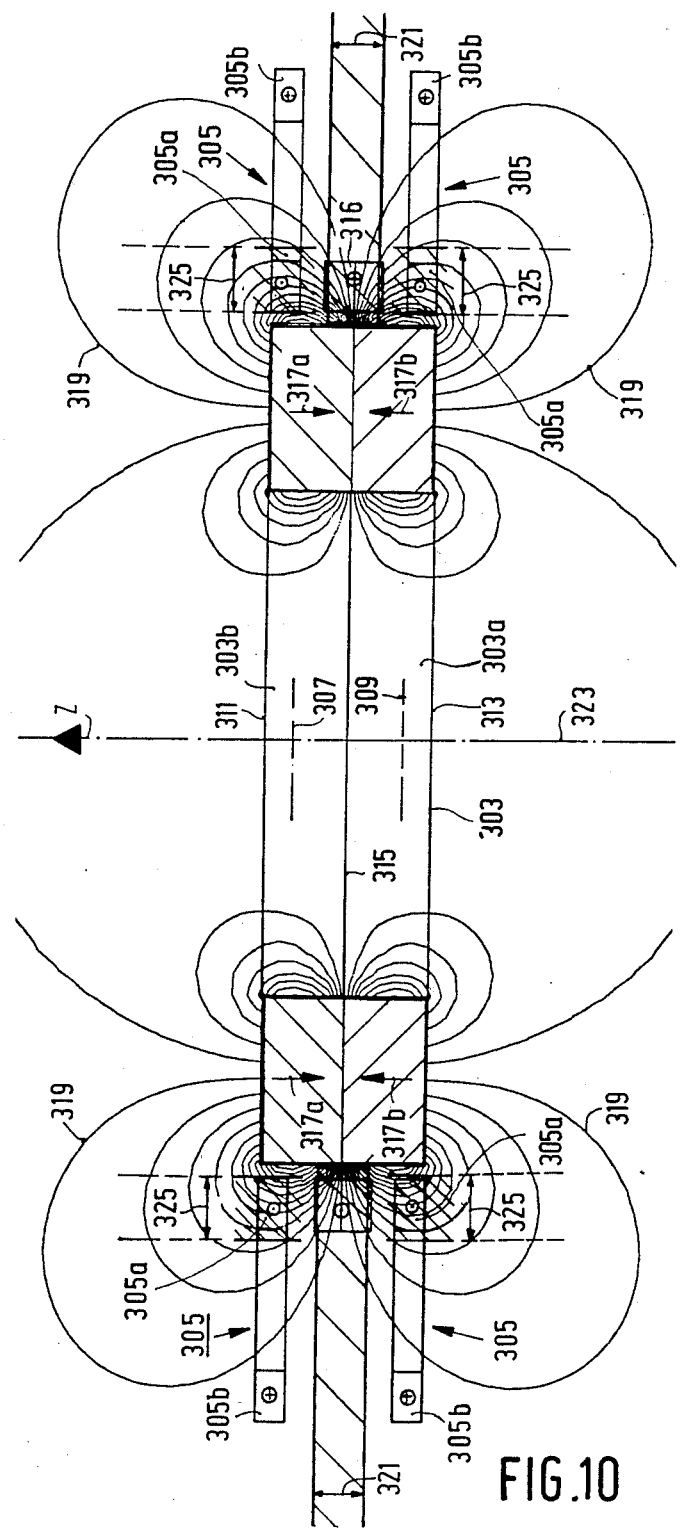
Figure 11:
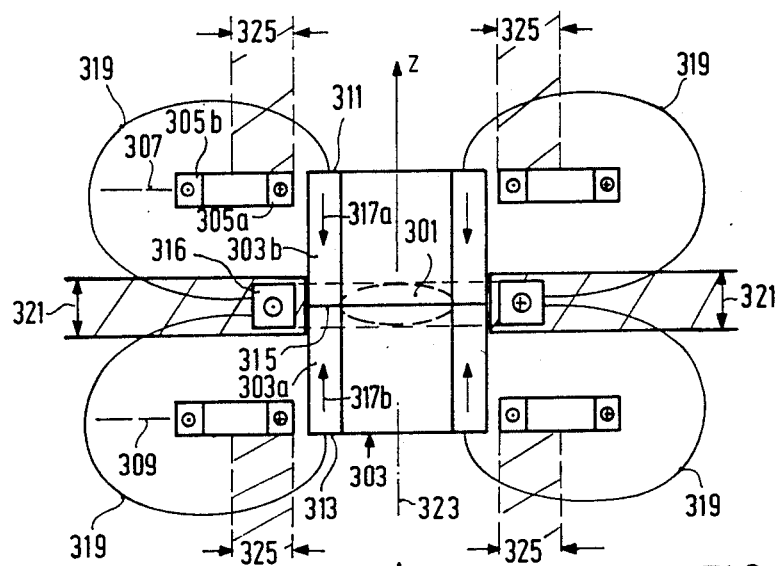
Figure 12:
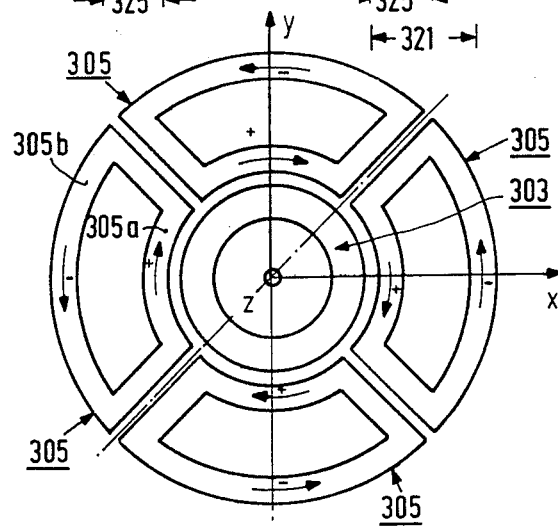
Figure 13:
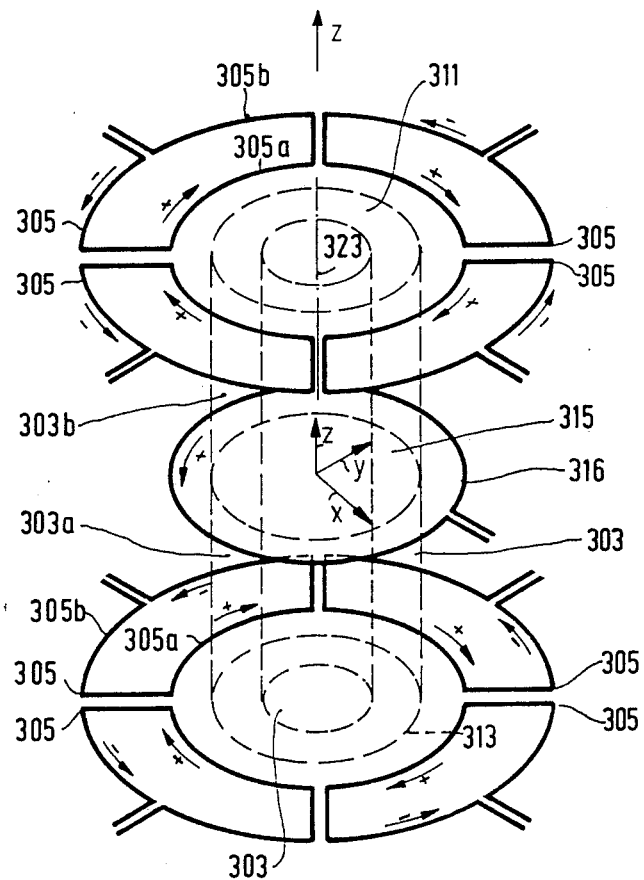
Figure 14:
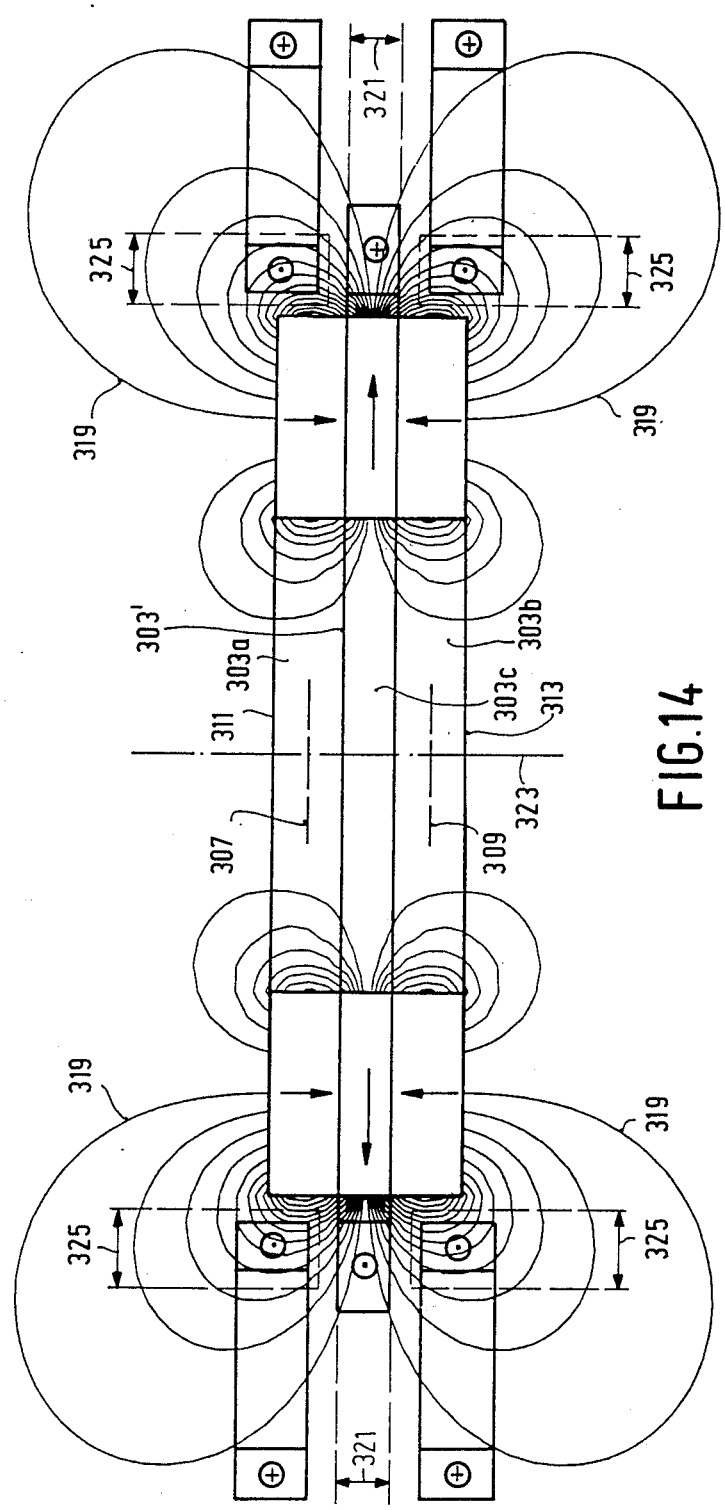
Figure 15:
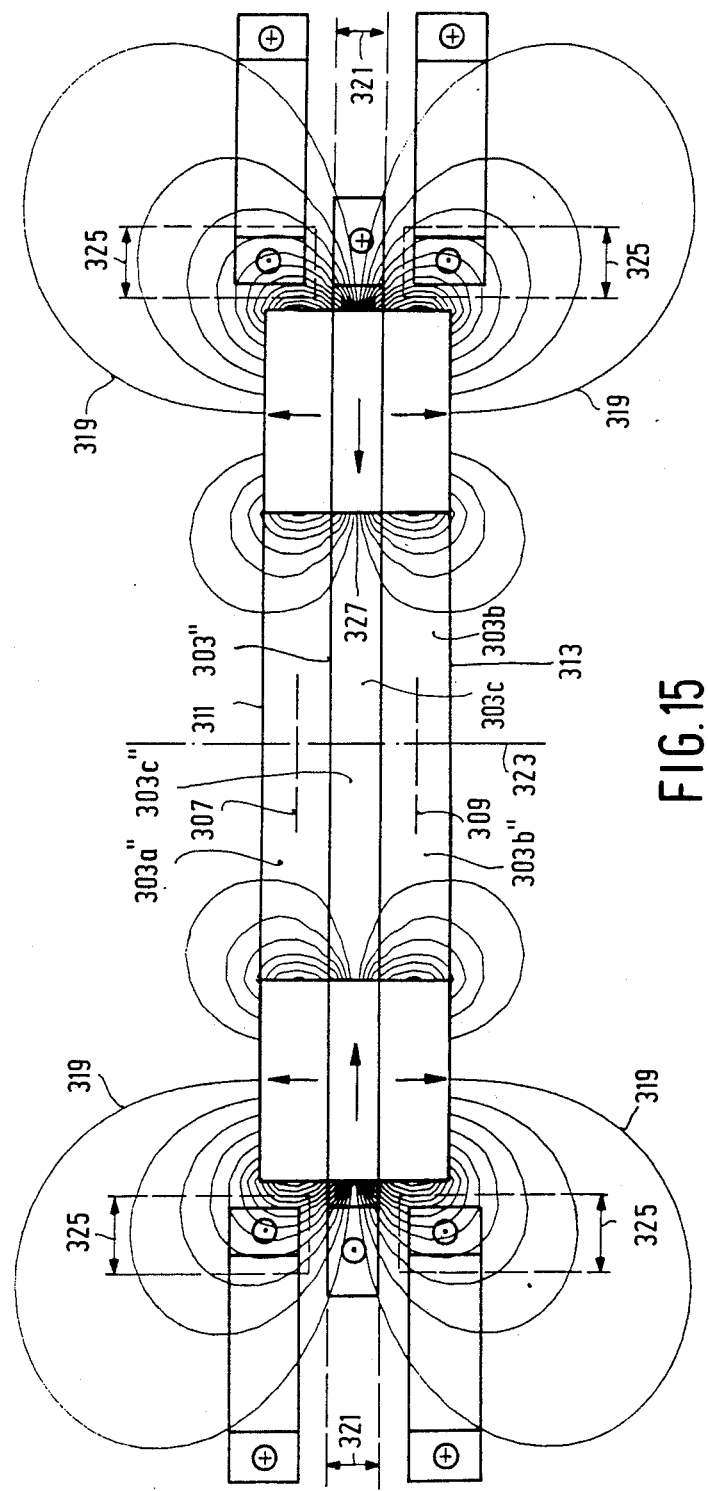
Figure 16:
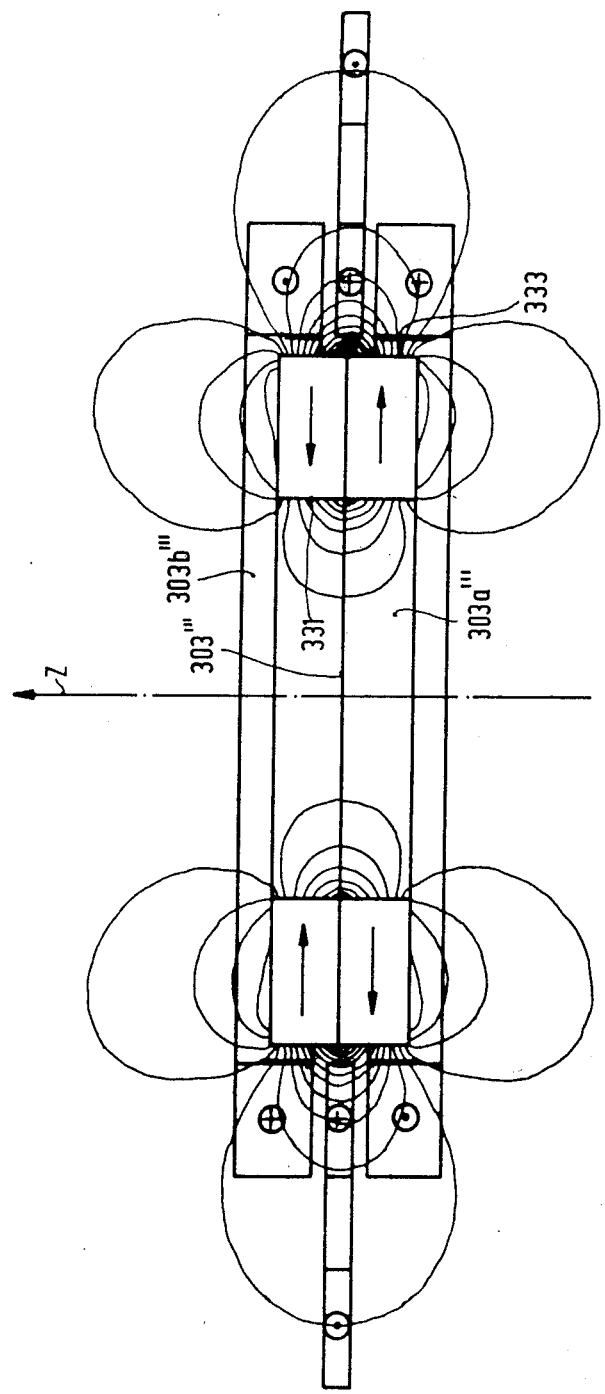
Figure 17:
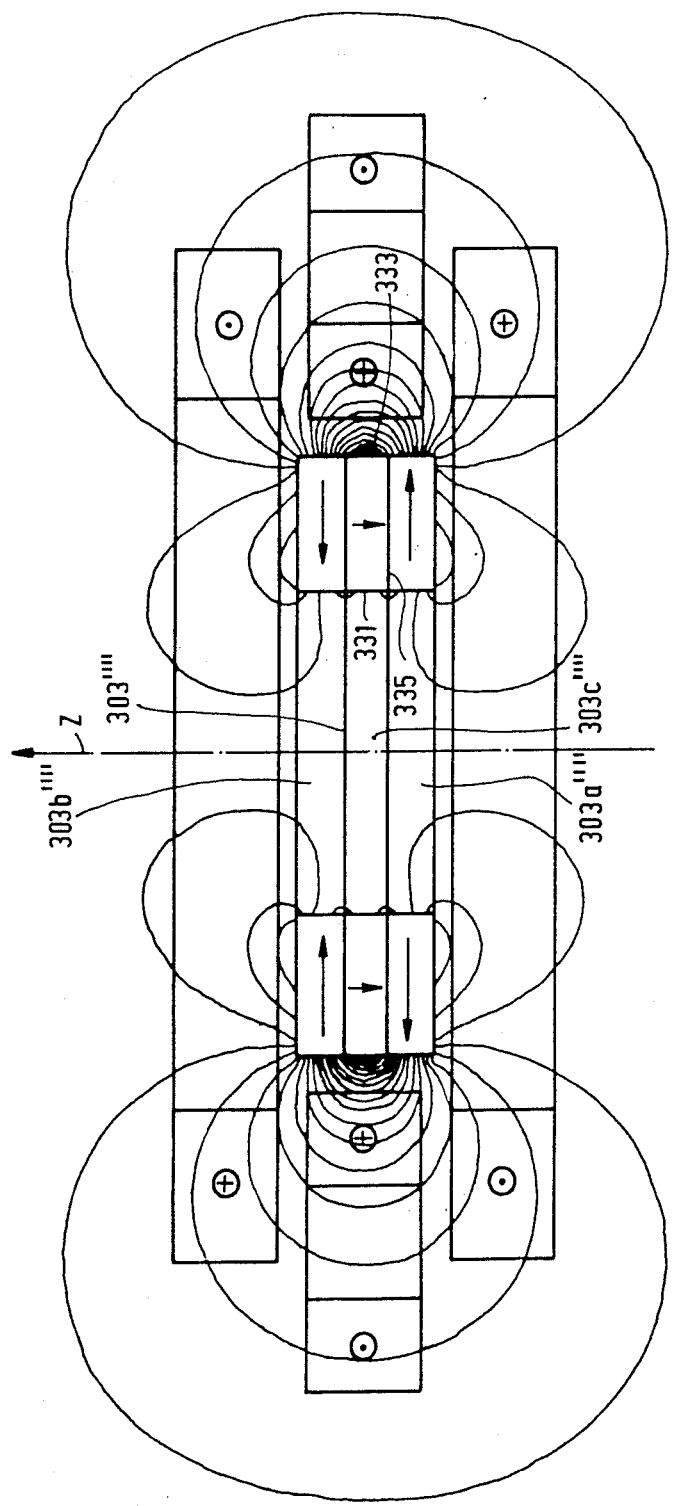

FIG. 10 a section through a further embodiment of the optical scanning unit according to the invention, FIG. 11 another representation of the optical scanning unit according to FIG. 10, also in section, FIG. 12 a top view of a set of four segmental coils as in FIGS. 10 and 11, FIG. 13 diagrammatic representation of the optical scanning unit as in FIGS. 10 to 12, FIG. 14 a modified design of the magnetic body, FIG. 15 a further modified design of the magnetic body, FIGS. 16 and 17 the optical scanning unit with further variants of the magnetic body.

The scanning unit according to FIG. 1 has a radiation source 1, for example a diode laser, a collimator lens 3 and an objective 5 with an optical axis 5A. The objective is arranged in an objective mount 7 of an electromagnetic drive device described in detail hereinafter. The collimator lens 3 and the objective 5 can have several lens elements, but preferably of a single lens element with at least one aspherically refracting surface. In the arrangement of FIG. 1, the objective has only one objective lens produced, for example by a replica method. The objective lens is provided with a ring-shaped mirror 9 for a position detection system not described in detail here. Such a position detection system is described in Dutch Pat. No. 8501665, which corresponds to U.S. Pat. No. 4,638,471, incorporated herein by reference.

The divergent beam b from the radiation source 1 is converted by the collimator lens 3 into a parallel beam which fills the aperture of the objective 5 perfectly. The objective focusses the beam into a diffraction-limited radiation spot V with a diameter of, for example, 1 μm on the information surface 11 of a disc-shaped information carrier 13 of which a small part is shown in radial section in FIG. 1. The information is stored in concentric tracks 15 or quasi-concentric tracks which form a spiral track. The information is recorded as a plurality of optically detectable information areas between which there are intermediate regions. Preferably, the information surface 11 is close to the top of the information carrier 13 so that the beam b passes through the transparent substrate 17 of the information carrier before it reaches the information surface. The information surface is, preferably, radiation-reflecting so that the beam is reflected in the direction of the radiation source.

In the case of a rotating information carrier, the beam reflected from the information surface is modulated in accordance with the sequence of information areas and intermediate regions in the track being read. The modulated beam is separated from the beam emitted by the radiation source, by an uncoupling element 19 which may be, for example, a prism having a separating plane 21 which reflects at least part of the reflected beam to the radiation-sensitive detector 23. The detector 23 converts the modulated beam into an electrical signal which, in the known manner, is processed, depending on the form of the stored information, so that the information can be made visible or audible or processed in another way.

On the righthand side of FIG. 1 there is drawn an orthogonal coordinate system XYZ which should be considered as having its origin 0 at the point M so that the Z-axis coincides with the principal ray L of the beam b. The Z-axis extends in the axial direction, and this is the direction in which the objective must be moved to focus the beam b into the light spot V. The X-axis and the Y-axis extend in the radial and tangential directions, respectively, with respect to axis of rotation of the infomation carrier. Because the light spot V has to follows the tracks of the rotating information disc as closely as possible, it is necessary that the objective 5 can undertake straight-line movements along the X-axis and the Y-axis as well as any rotations about these axes. The movement of the objective along the Z-xis is known as the focusing movement, while the other movements are known as the track following and time-error correcting movements.

FIGS. 2 to 7 illustrate in detail several possible electromagnetic drive devices for the scanning unit of the invention. In principle, each drive device has a flexibly suspended ring-shaped magnetic body and a number of fixed coils arranged around this body, the coils being arranged in three parallel radial zones. The magnetic body is ring-shaped or sleeve-shaped and made from a permanent-magnetic material. Magnetic materials with a high energy content such as neodymium-iron-boron and samarium-cobalt are preferred. The coils in the zones concerned are located in specific parts of the magnetic force field of the magnetic body. In order that the objective can undertake the above-described desired movements without parasitic resonances, the objective is magnetically mounted in the drive device while the other elements of the scanning unit have no physical contact.

Figure 2:
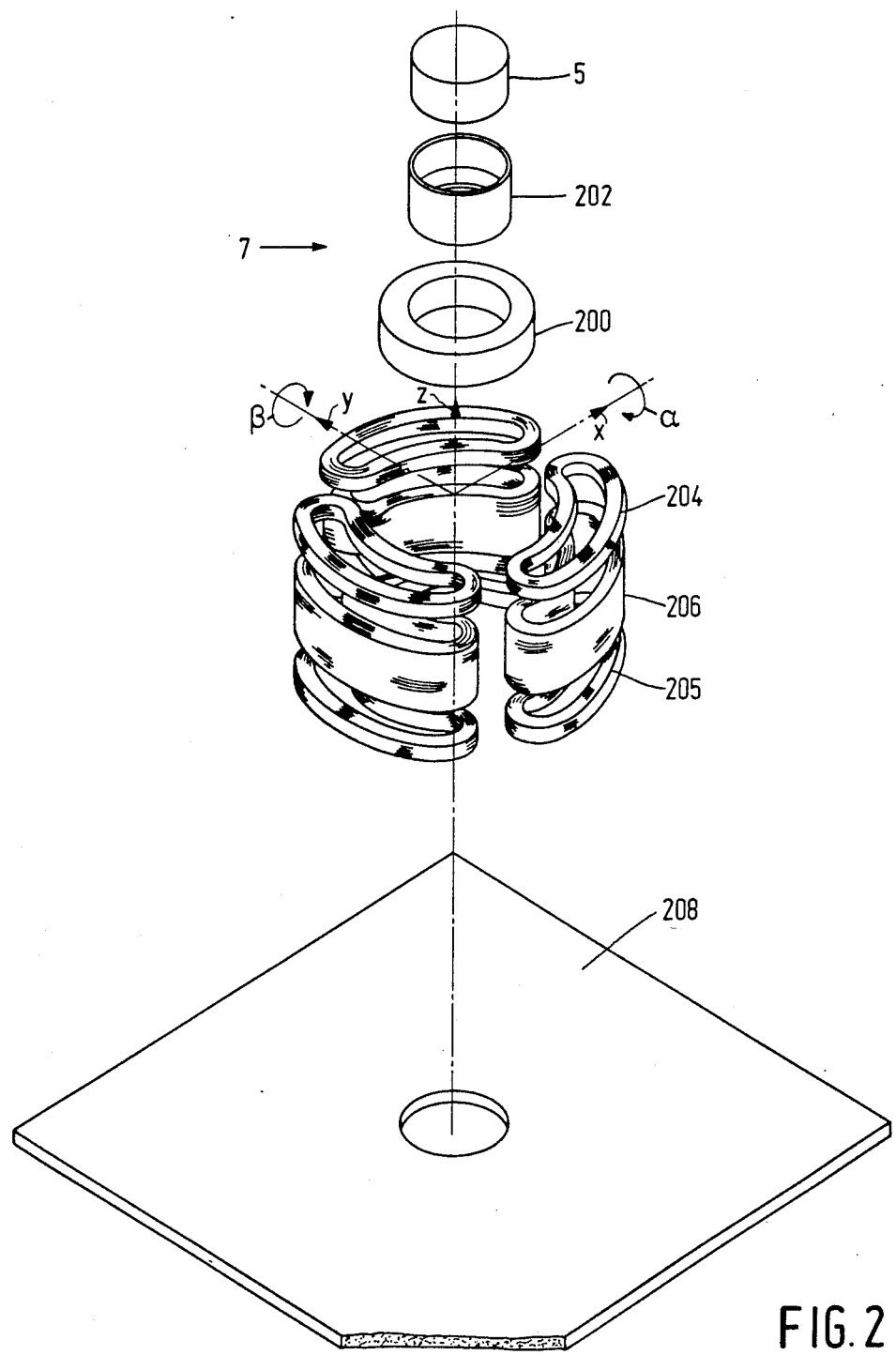
Figure 3:
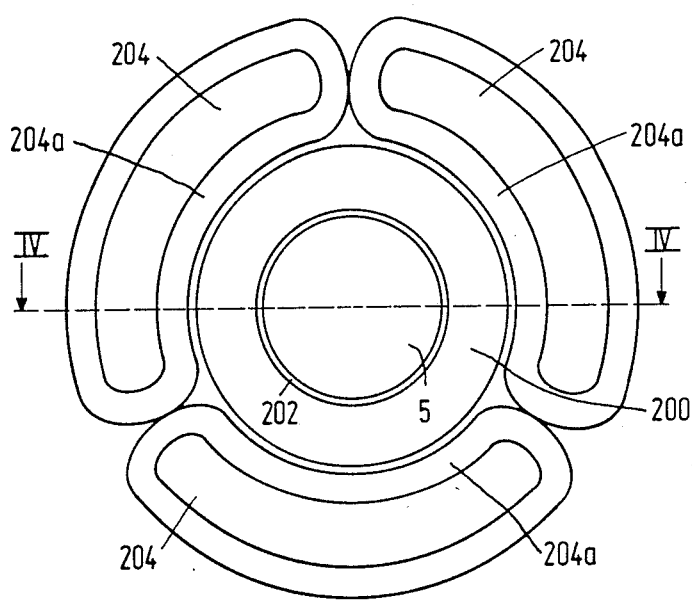
Figure 4:
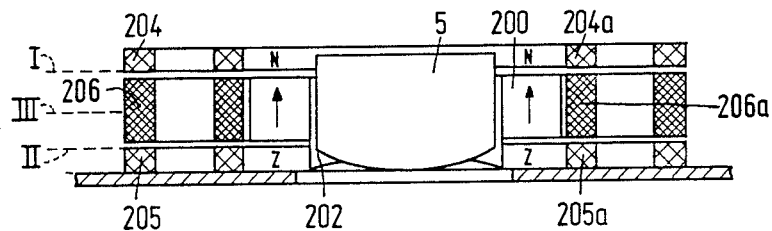

FIGS. 2, 3 and 4 show a drive device with a magnetic body 200 which is axially magnetized, as indicated by arrows in FIG. 4, which means that a south pole Z and a north pole N are formed at the axial ends of the magnetic body 200. The magnetic body 200 forms, together with a holding ring 202, the objective mount 7 for the objective 5. Three sets of coils 204, 205 and 206 are fixed coaxially around the magnetic body 200 on a supporting plate 208. Each of the sets has at least three banana-shaped segmental coils. The sets 204, 205 and 206 are arranged along three axially shifted radial planes, that is planes which are normal to the central z axis. The three radial planes extend radially with respect to the magnetic body 200, and in fact along two outer radial planes I and II and a central radial plane III lying between these as indicated in FIG. 4. The objective 5 which can be moved axially along the Z-axis with respect to the coil sets is shown in the central position in FIG. 4, this being the position from which the objective can be moved as far upwards as downwards. In the central position of the objective 5, the outer radial planes I and II lie opposite magnetic poles N and Z respectively of the magnetic body 200. The number of segmental coils in each of the sets 204, 205 and 206 is not limited to three; four or even more than four are also possible.

Preferably, the segmental coils of set 206 in the central radial plane III have larger axial dimensions than the segmental coils of sets 204 and 205. The segmental coils of sets 204, 205 and 206 each have an active coil part 204a, 205a and 206a, respectively, i.e. the coil part lying nearest to the magnetic body 200, located in a favourable part of the magnetic field of magnetic body 200. Thus the field lines of the magnetic field extend mainly in the radial direction at the location of the active coil parts 204a and 205a of the coils of sets 204 and 205 in planes I and II, respectively. This means that when current is applied, the entire coils in planes I and II can exert axially directed forces on the magnetic body. Therefore coil sets 204 and 205 in the outer radial planes I and II are highly suitable for producing the focussing movement of the objective 5 along the Z-axis. On the other hand, the active coil part 206a of the coil set 206 in the central radial plane III lies in a part of the magnetic field where the field lines are mainly axial. When current flows through these coils, radially directed forces are, therefore, exerted on the magnetic body 200. For straight-line movement of the objective 5 and along the X-axis and the Y-axis for track following the time correction, segmental coils of set 206 in the central zone III can be sucessfully excited. If the segmental coils of sets 204 and 205 in the outer planes I and II are excited in different ways, then moments can also be transferred to the magnetic body 200. This means that the drive can also be used to tilt the objective through a limited angle and about the X- or Y-axis, making additional track following and time correction movements of the objective possible.

Figure 5:
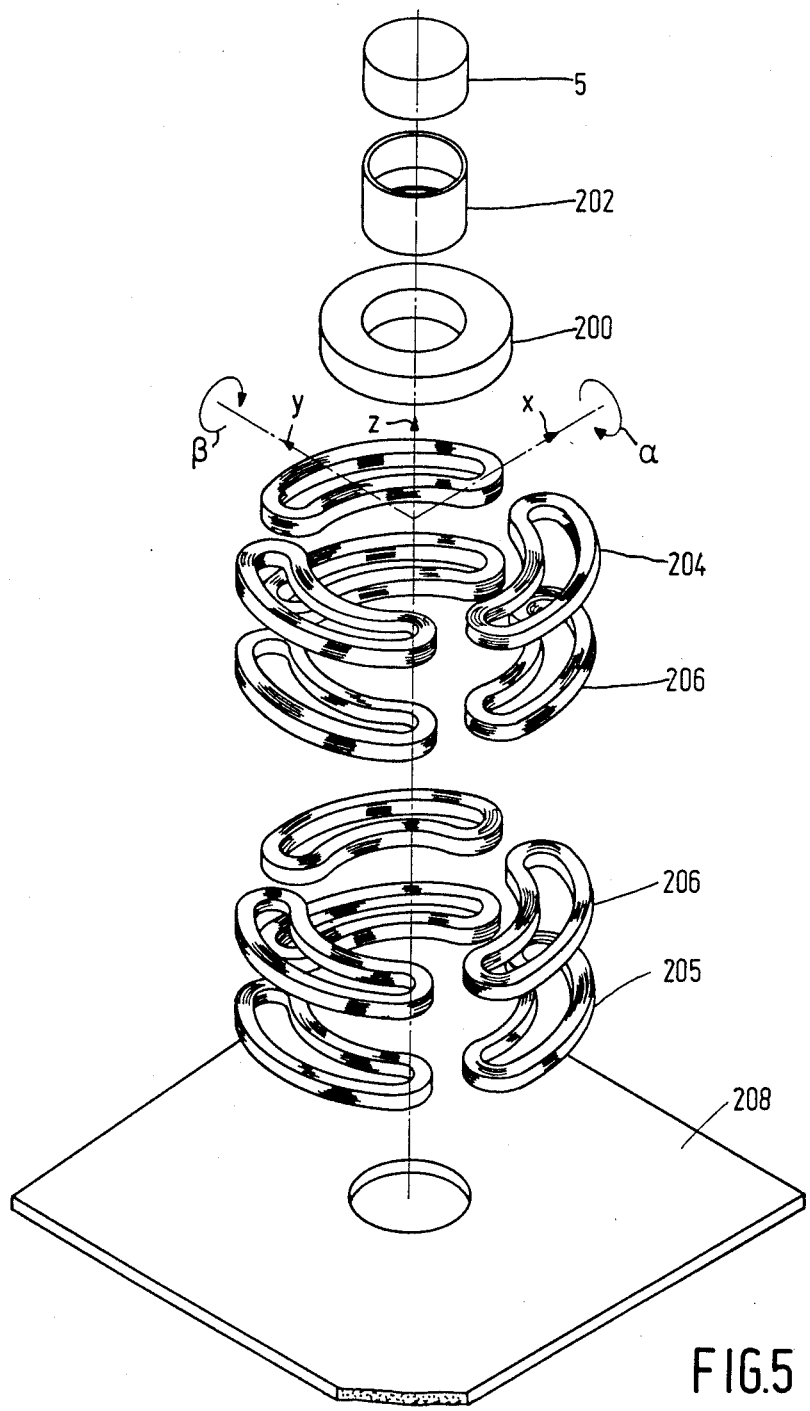

The drive device illustrated in FIG. 5 is largely the same as the drive device described above and is, therefore, only briefly described. Once again, the drive device is equipped with magnetic body 200 in which the mount 202 is fixed to the objective 5. In this case, however, the drive device has four sets of segmental coils which are arranged in four radial planes, two radial planes corresponding to the outer radial planes I and II already mentioned and the other two radial planes corresponding to the above-mentioned central radial plane III. Sets 204 and 205 are locatedin the outer radial planes I and II in the manner already described. The difference from the preceding drive device lies in the construction of the coil sets in the central radial planes III, whereby each central radial plane comprises a set 206 of three or, where necessary, more segmental coils. An axial spacer may be provided between the sets 206.

Figure 7:
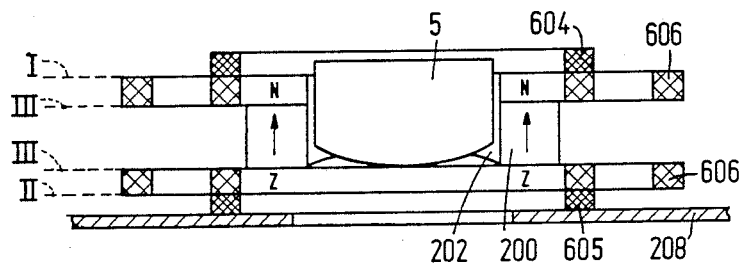
Figure 6:
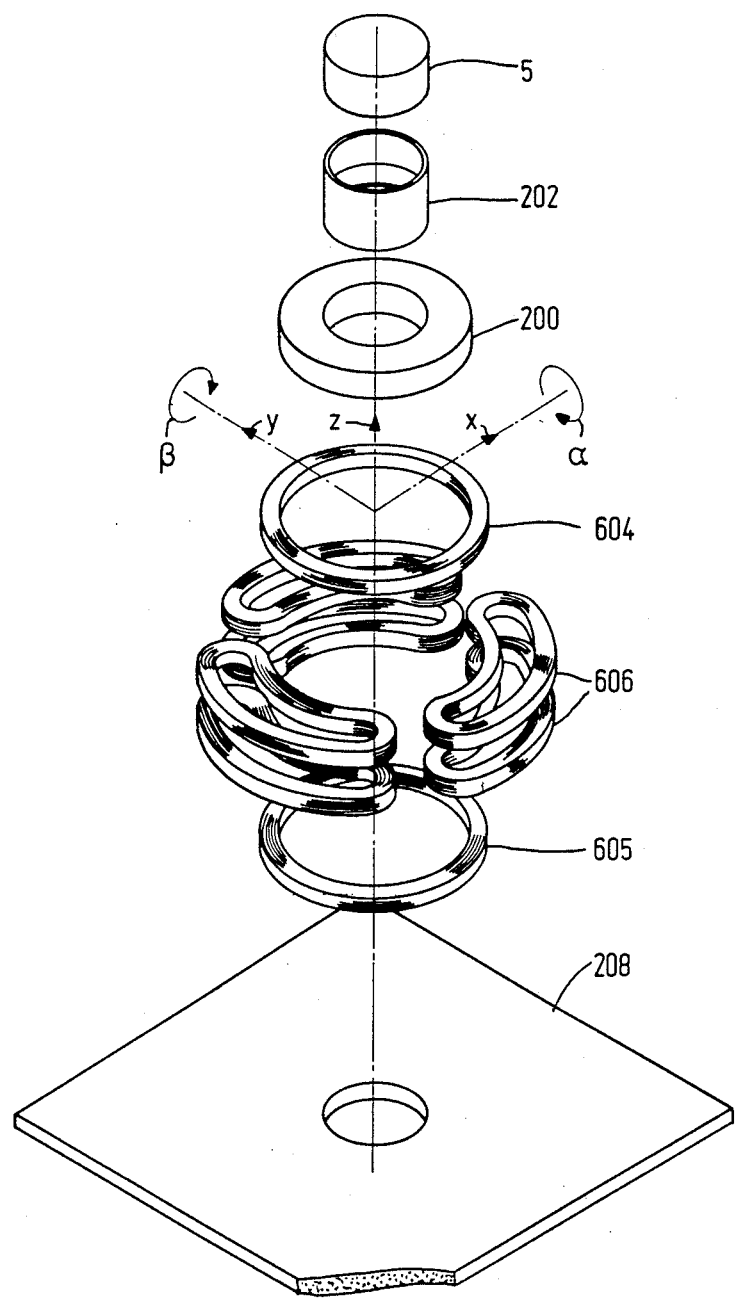

FIGS. 6 and 7 show an electromagnetic drive device according to the invention in which the arrangement of the coils in the outer radial planes differs from that in the preceding embodiments. Here, too, the drive device has the axially magnetized moving magnetic body 200 to which the mount 202 for the objective 5 is fixed. The fixed coils are arranged, as in each of the previous embodiments, along three parallel radial planes extending at right angles to the Z-axis. In each of the outer planes I and II there is a toroidal coil 604 arranged coaxially around the magnetic body. The toroidal coils are aligned so that the field lines of the magnetic field of the magnetic body 200 extend mainly radially at the location of the toroidal coils 604. When the toroidal coils are excited, axially directed forces are exerted thereby on the magnetic body 200. The focussing adjustment of the objective 202 can be performed, therefore, by actuation of annular coils 604 and 605. In the central radial planes III lying between the annular coils 604 and 605, two banana-shaped segmental coil sets 606 are arranged a certain distance apart. Each set has preferably three or four segmental coils which extend in groups around the magnetic body 200 in a ring shape leaving an air gap free. The segmental coils are located in regions of the magnetic field of the magnetic body 200 where the field lines extend more or less axially. This means that when the segmental coils are excited, mainly radially directed forces are exerted on the magnetic body. The segmental coil sets 606 therefore can cause straight-line movements of the objective and along the X-axis and the Y-axis. Furthermore, tilting of the objective can be achieved by selective excitation of the segmental coils.

Figure 9:
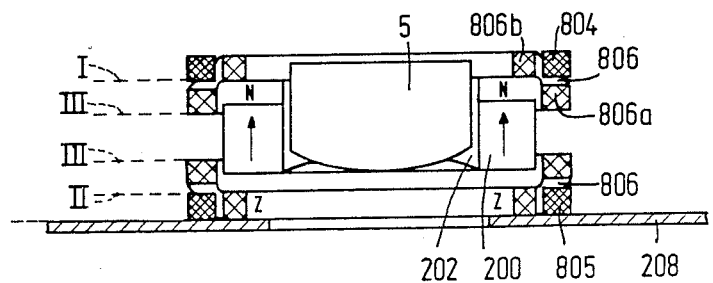
Figure 8:
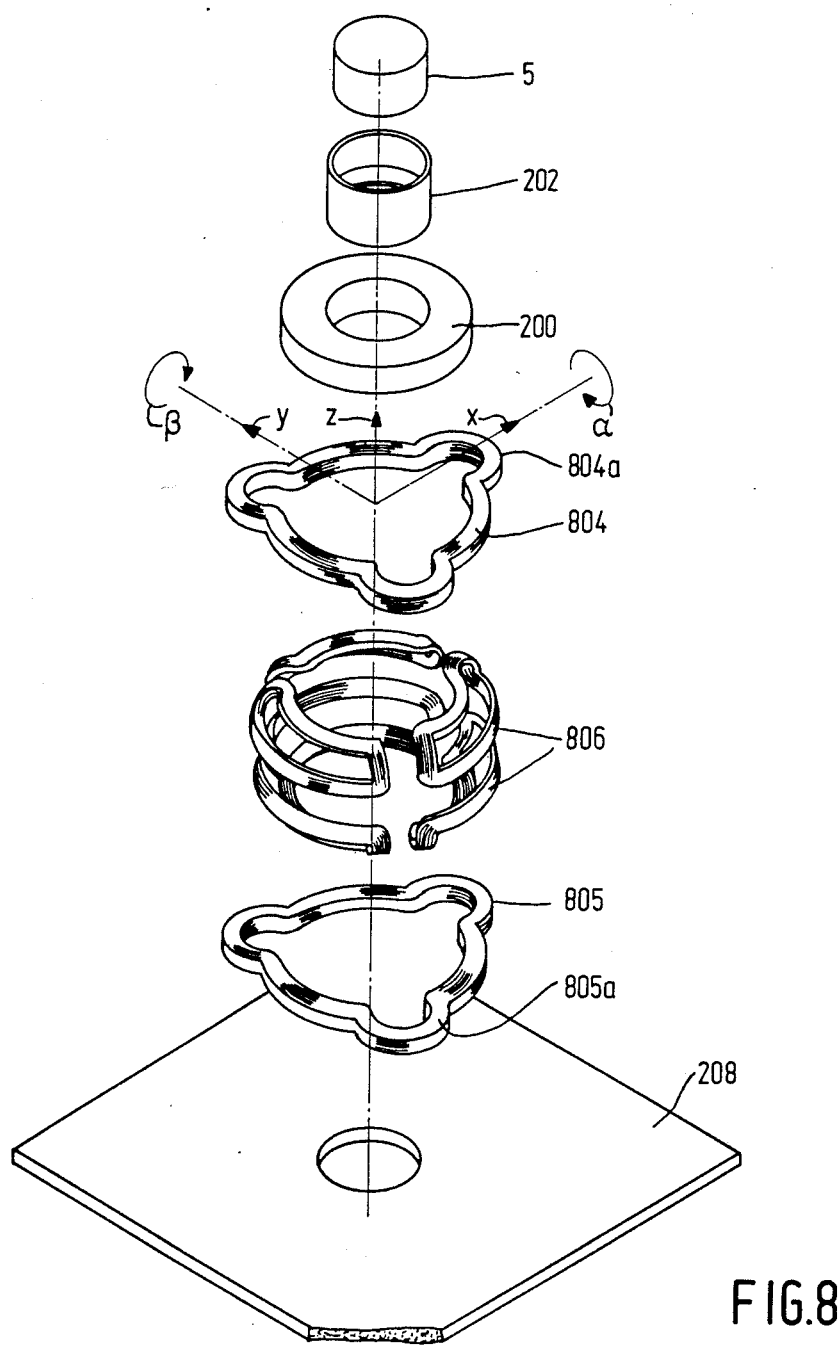

An extremely interesting electromagnetic drive device from the economic point of view is illustrated in FIGS. 8 and 9. As far as the moving part is concerned, this drive device is the same as in the embodiments already described, but its fixed part has a special design. In this embodiment the coils are again arranged along three parallel radial planes at right angles to the Z-axis, but in this case there is a certain overlapping of the coils of the outer radial planes I and II and the coils of the central radial planes III, as illustrated in FIG. 9. In the two outer radial planes I and II there is a toriodal coil 804 and 805a respectively.

At the location of the annular coils 804 and 805, the field lines of the magnetic field of the axially magnetized magnetic body 200 extend mainly radially, just as in the preceding embodiment, so that here too the purpose of these coils is to drive the objective along the Z-axis.

In the central radial planes III, two sets of wing-shaped segmental coils 806 are arranged to a certain axial distance apart. Again, each set consists, preferably, of three or four coils, all the coils together forming a more or less closed shell around the magnetic body. Due to the special shape of the segmental coils 806, each coil has two active coil parts 806a and 806b which are both located in the magnetic field. The location of the active coil parts 806a and 806b is such that at the location of these coil parts, the field lines are directed mainly in an axial direction. This arrangement makes it possible to perform rapid and highly satisfactory track following and time correction movements of the objective. The coil parts lying between the active coil parts extend through the projections 804a and 804b already mentioned enabling a compact construction to be achieved.

The optical scanning unit illustrated schematically in FIGS. 10 to 13 has a permanent-magnetic body 303, indicated only schematically. This ring-shaped magnetic body 303 which acts as the objective mount is suspended in a coil system in a manner not described in detail. This coil system consists here of two segmental coil sets 305 which are arranged in the outer radial planes 307 and 309 in the region of the axial ends 311, 313 of the magnetic body 303. There is a toroidal coil 316 around the permanent-magnetic body 303 at its centre 315. The magnetic body 303 is subdivided at its centre 315 into two part rings 303a and 303b which are axially magnetized in opposite directions. This is indicated by the opposing directions of the arrows 317a and 317b in FIG. 10.

The field lines 319 illustrated in FIG. 10 show that in the area at the center 315 of the body 303 there is a region 321 in which the field lines extend largely radially with respect to th body axis. In the areas at the ends 311 and 313, however, there are regions 325 in which the field lines extend mainly axially with respect to the axis 323. These regions with preferred field line pattern are now largely actuated separately by the individual types of coil, namely the segmental coils 305, on the one hand, and the ring-shaped coil 316 on the other, and are used for adjusting the objective mount or the permanent-magnetic body 303. By excitation of ring-shaped coil 316 it is possible to adjust the magnetic body 303 in the axial direction, indicated by Z in the drawing. When segmental coils 305 are excited, the magnetic body 303 can be adjusted in the radial direction, i.e. in the X- and Y-directions in FIG. 12.

FIG. 12 shows a plan view of a set of four segmental coils 305. The individual segmental coils 305 are designed as flat coils and are arranged next to one another around the magnetic body 303. As shown by the arrows in FIG. 10, for each individual segmental coil 305 in the coaxially arranged coil sections 305a and 305b, the currents are in opposing directions. This means that the currents flowing in the individual coil parts 305a and 305b act in opposing directions on the magnetic field. This can cause a weakening of the actuation force. To obtain optimum compensation for this drawback, the outer coil sections 305b are spaced as far as possible from the inner coil sections 305a.

FIG. 11 shows another diagrammatic representation of the optical scanning unit in FIG. 10. As in FIG. 10, the segmental coils 305 are located in the region of the axial ends 311 and 313, and the toroidal coil 316 is located in the region of the center 315 of the magnetic body 303.

While the axial length of the ring-shaped magnetic body in FIG. 10 is relatively small, its length in FIGS. 11 and 12 is larger. However, this difference has been selected merely to make things clearer. In itself, the magnetic body is axially relatively short (e.g. approx. 5 to 6 mm) and, accordingly, the optical scanning unit is very thin. All the coils of the individual radial planes can be arranged, for example, as laminar conductors on circuit boards.

The position of the optical scanning unit in FIGS. 10 to 12 acts as a five-axis actuator. The magnetic body 303 can be adjusted axially along the Z-axis by means of ring-shaped coil 316. Apart from smaller actuating components of the segmental coils 305, which also act axially, these coils adjust the radial position of the magnetic body 303 in the direction of axes X and Y. If the segmental coils of the individual coil sets at the axial ends are actuated differently, then, apart from these three directions of movement, it is also possible to achieve two rotary movements, i.e. rotation about the X-xis and about the Y-axis. These five possible adjustments are fully sufficient for the floating-mount magnetic body 303 to be adjusted in all desired positions in which perfect scanning of an information carrier or perfect writing on an information carrier is possible.

The two part rings 303a and 303b of the magnetic body 303' (FIG. 14) should not adjoin one another directly. To improve the field configuration in the area of the radial zone it may be advisable to place an intermediate ring 303a of soft-magnetic or non-magnetic material between the permanent-magnetic rings. If the intermediate ring 303c is made of permanent-magnetic material, it is preferable for it to be radially magnetized. The direction of magnetization of the entire magnetic body 303' is chosen in such a way that the magnetic north poles of the part rings 303a and 303b are directed towards the intermediate ring 303c and the magnetic north poles of the intermediate ring 303c are directed towards the oute wall 327 of the sleeve.

Another embodiment of the magnetic body 303" (FIG. 15) again incorporates an intermediate ring 303c". In this case the part rings 303a" and 303b" are magnetized in such a way that their magnetic north poles are at the outer axial ends 311, 313, whereas the magnetic north poles of the intermediate ring 303c" are directed towards the inside wall 327. In this way it is possible to give preference to the adjustment properties in one or other axis or even in two axes. Thus, desired properties (the working range, for example) can be improved and parasitic properties reduced.

In FIG. 16 the magnetic body 303''' consists of two part rings 303'''a and 303b''' placed axially on top of one another. The part rings 303''' and 303b''' are radially magnetized in opposite directions. The north poles of the top part ring 303b'' for the information carrier disc not shown are along the inside wall 331 of this part ring 303b''' and the north poles of the lower ring 303a''' are at the outside wall 333 of this part ring.

The diagram in FIG. 17 shows yet another intermediate ring 303c'''', axially magnetized, between the part rings 303a'''' and 303b'''' of the permanent-magnetic sleeve 303''''. If it is assumed that the information disc is located above the sleeve 303'''', then the upper ring 303b'''' is magnetized radially with respect to the inside wall (north poles at inside wall 331) and the lower part ring 303a'''' is magnetized radially with respect to the outside wall 333 (north poles at outside wall 333). The north poles of the axially magnetized intermediate ring 303c'''' are then at the end 335 of this intermediate ring 303c'''' turned away from the information carrier disc. A reversal of this form of magnetization is possible if so desired.

What is claimed is:

1. An apparatus for scanning, with a beam of radiation, recording tracks on an information surface of an optical record carrier, said apparatus comprising means for converging said beam along an optical axis so as to form a scanning spot on said information surface, means for supporting said converging means for controllable movement with respect to said information surface, said supporting means comprising a movable annular member of magnetic material arranged about said optical axis, said converging means being supported by said annular member for movement therewith, first electromagnetic coil means disposed in each of two axially spaced outer planes which are generally perpendicular to said optical axis, each of said outer planes and said first coil means disposed therein being located adjacent a respective axial end of said annular magnetic member, said first coil means interacting with said annular magnetic member through an air gap therebetween so as to exert a first force on said annular member upon excitation of said first coil means, and second electromagnetic coil means arranged in a central plane which is generally perpendicular to said optical axis and is located between said outer planes, said second coil means interacting with said annular magnetic member via an air gap therebetween so as to exert a second force on said annular member upon excitation of said second coil means.

2. The apparatus according to claim 1, wherein each first coil means comprises at least three coils spaced about a respective axial end of said annular magnetic member and said second coil means disposed in said central plane comprises at least three coils spaced about the central portion of said annular magnetic member, each of said coils of said second coil means having an inner, active portion adjacent said annular magnetic member and an outer portion spaced further away from said annular magnetic member than said inner portion.

3. The apparatus according to claim 1 wherein said first force exerted by said first coil means on said annular magnetic member is directed so as to displace said annular magnetic member and said converging means supported thereby from a predetermined position in a direction parallel to said optical axis to thereby focus said spot on said information surface and said second force exerted by said second coil means on said annular magnetic member is directed to as to displace said annular magnetic member and said converging means supported thereby from said predetermined position in a direction normal to said optical axis to thereby move said spot with respect to a given track.

4. The apparatus according to claim 1 or 2 wherein said annular member is axially magnetized with the magnetic poles at the axial ends thereof.

5. The apparatus according to claim 2 wherein said coils of said second coil means have axial dimensions which are larger than the axial dimensions of said coils of said first coil means.

6. The apparatus according to claim 1 wherein said annular member is axially magnetized with magnetic poles at the axial ends thereof and each first coil means has an annular coil which is positioned adjacent the respective axial end of said annular member and which extends about said optical axis and wherein said second coil means comprises at least three coils spaced about the central portion of said annular member.

7. The apparatus according to claim 6 wherein each of said coils of said second coil means has an inner, active portion adjacent said annular magnetic member and extending along the periphery thereof and an outer portion spaced further away from said annular member than said inner portion.

8. The apparatus according to claim 6 wherein said coils of said second coil means have a first active coil portion extending along the periphery of said annular member and at least two further active coil portions each disposed opposite the magnetic pole at a respective one of the two axial ends of said annular member, said first and further coil portions of respective coils being connected to each other.

9. The apparatus according to claim 8 wherein each annular coil of said first coil means has outwardly projecting loops through which said further active coil portions project.

10. The apparatus according to claim 1 wherein each first coil means comprises at least three coils spaced about the respective axial end of said annular member and wherein said annular member is comprised of two superposed magnetic rings which are magnetized in opposite directions and said second coil means comprises an annular coil which encircles said annular member.

11. The apparatus according to claim 10 including an intermediate ring disposed between said pair of magnetic rings.

12. The apparatus according to claim 11 wherein said intermediate ring is made of magnetically soft material.

13. The apparatus according to claim 11 wherein said intermediate ring is made of non-magnetic material.

14. The apparatus according to claim 11 wherein said pair of magnetic rings are axially magnetized in opposite directions and said intermediate ring is made of magnetic material and is radially magnetized.

15. The apparatus according to claim 11 wherein said magnetic rings of said pair are axially magnetized such that the north pole of each of said magnetic rings is adjacent said intermediate ring and said intermediate ring is made of magnetic material and is radially magnetized so that the north pole of said intermediate ring is at its outer periphery.

16. The apparatus according to claim 11 wherein said magnetic rings are axially magnetized such that the south poles of said magnetic rings are adjacent said intermediate ring and the north pole of said intermediate ring is at the inner periphery therof.

17. The apparatus according to claim 10 wherein said coils of said first and second coil means are comprised of laminar conductors on circuit boards.

18. The apparatus according to claim 1 wherein each of said first coil means comprises an annular coil which is positioned adjacent the respective axial end of said annular member and which extends about said optical axis, said second coil means comprises at least three coils spaced about the central portion of said annular member, and wherein said annular member comprises a pair of superposed, magnetic rings which are radially magnetized.

19. The apparatus according to claim 18 including an intermediate axially magnetized ring arranged between said pair of magnetic rings.

20. The apparatus accordng to claim 19 wherein the magnetic ring of said pair which is adjacent said record carrier is magnetized radially such that its north pole is adjacent the inner periphery thereof and the other magnetic ring of said pair is magnetized radially so that its north pole is at the outer periphery thereof, and wherein said intermediate ring is axially magnetized such that its north pole is at the axial end therof which is further away from said record carrier.

21. An apparatus according to claim 1 wherein said converging means includes at least one lens and means for mounting said lens in said annular member coaxially with said optical axis.

22. An apparatus for scanning, with a beam of radiation, recording tracks on an information surface of an optical record carrier, said apparatus comprising means for converging said beam along an optical axis to as to form a scanning spot on said information surface, means for supporting said focusing means for controllable movement with respect to said information surface, said supporting means comprising a movable annular member of magnetic material, said annular member being axially magnetized and arranged so that it is generally coaxial with said optical axis, said converging means being supported by said annular member for movement therewith, a pair of outer electromagnetic coil means each arranged adjacent a respective axial end of said annular member so that upon excitation thereof, said outer coil means interact with said annular member so as to controllably displace said annular member and said beam converging means supported thereby in a direction parallel to said optical axis to thereby control the focusing of said beam on said information surface, and further electromagnetic coil means arranged between said outer coil means so that upon excitation, said further coil means interacts with said annular member to controllably displace said annular member and said beam converging means supported thereby in a direction such that said scanning spot is moved on said information surface relative to a given track.

23. The apparatus according to claim 22 wherein each outer coil means comprises at least one coil having an active portion extending along the periphery of said annular member adjacent a respective axial end thereof, said active coil portion of said at least one coil of said outer coil means being positioned in a region wherein the direction of the magnetic field produced by said annular member extends mainly in the radial direction so that an axially directed force is produced upon excitation of said at least one coil and wherein said further coil means comprises at least one further coil having an active portion which extends along the periphery of said annular member and is positioned in a region wherein the magnetic field produced by said annular member extends mainly in the axial direction so as to produce a radially directed force which displaces said annular member in a direction normal to said optical axis.

24. An apparatus for scanning, with a beam of radiation, recording tracks on an information surface of an optical record carrier, said apparatus comprising means for converging said beam along an optical axis so as to form a scanning spot on said information surface, means for supporting said focusing means for controllable movement with respect to said information surface, said supporting means comprising a movable annular member of magnetic material, said annular member being arranged so that it is generally coaxial with said optical axis, said converging means being supported by said annular member for movement therewith, a pair of outer electromagnetic coil means each arranged adjacent a respective axial end of said annular member so that upon excitation of said outer coil means, said outer coil means exert a first force on said annular member and further coil means arranged between said outer coil means so as to exert a second force on said annular member upon excitation of said further coil means, said first and second forces being such as to move said annular member and said beam converging means supported thereby with respect to at least two axes of a system of three orthogonal axes one of which is parallel to said optical axis.

* * * * *